United States Patent [19]

Nagano

[11] Patent Number: 5,612,737
[45] Date of Patent: Mar. 18, 1997

[54] ELECTRONIC STILL CAMERA WITH TEMPORARILY HALTING AND RESTARTING OF OPTICAL SYSTEM CONTROL

[75] Inventor: Masatoshi Nagano, Tokyo, Japan

[73] Assignee: Canon Kabushiki Kaisha, Tokyo, Japan

[21] Appl. No.: 610,384

[22] Filed: Mar. 4, 1996

Related U.S. Application Data

[62] Division of Ser. No. 394,069, Feb. 24, 1995, Pat. No. 5,523,784, which is a continuation of Ser. No. 261,747, Jun. 17, 1994, abandoned, which is a continuation of Ser. No. 134,472, Oct. 8, 1993, abandoned, which is a continuation of Ser. No. 999,194, Dec. 28, 1992, abandoned, which is a continuation of Ser. No. 646,695, Jan. 28, 1991, abandoned.

[30] Foreign Application Priority Data

| Feb. 1, 1990 | [JP] | Japan | 2-023379 |
| Feb. 1, 1990 | [JP] | Japan | 2-023380 |
| Feb. 23, 1990 | [JP] | Japan | 2-043567 |
| Feb. 23, 1990 | [JP] | Japan | 2-043568 |
| Feb. 26, 1990 | [JP] | Japan | 2-044713 |
| Feb. 26, 1990 | [JP] | Japan | 2-044714 |

[51] Int. Cl.$^6$ .......................... H04N 5/225; H04N 5/232
[52] U.S. Cl. .................... 348/207; 348/335; 348/358; 358/909.1; 358/906
[58] Field of Search .................. 348/207, 341, 348/335, 358, 362, 363; 358/909.1, 906, 209, 227, 228, 224, 225; 354/400, 402, 404; H64N 5/225, 5/232

[56] References Cited

U.S. PATENT DOCUMENTS

| 4,008,951 | 2/1977 | Himmelsbach . |
| 4,675,747 | 6/1987 | Hanma . |
| 4,760,452 | 7/1988 | Kaneko . |
| 4,802,020 | 1/1989 | Miyake . |
| 4,879,600 | 11/1989 | Ise . |
| 4,918,538 | 4/1990 | Saito . |
| 4,954,897 | 9/1990 | Ejima . |

FOREIGN PATENT DOCUMENTS

| 358172 | 3/1990 | European Pat. Off. . |
| 216177 | 6/1990 | Japan . |

*Primary Examiner*—Sherrie Hsia
*Attorney, Agent, or Firm*—Robin, Blecker, Daley & Driscoll

[57] ABSTRACT

An electronic still camera includes a photographic optical system having a variable focal length, an image sensor for converting an optical image formed by the photographic optical system into an electrical image signal, a recording circuit for recording on a rotary recording medium the electrical image signal produced by the image sensor, a focal-length adjusting device for adjusting the focal length of the photographic optical system, and a control circuit arranged to inhibit either one of a rotation of the rotary recording medium and a focal-length adjustment operation of the focal-length adjusting device when the other is being performed.

10 Claims, 10 Drawing Sheets

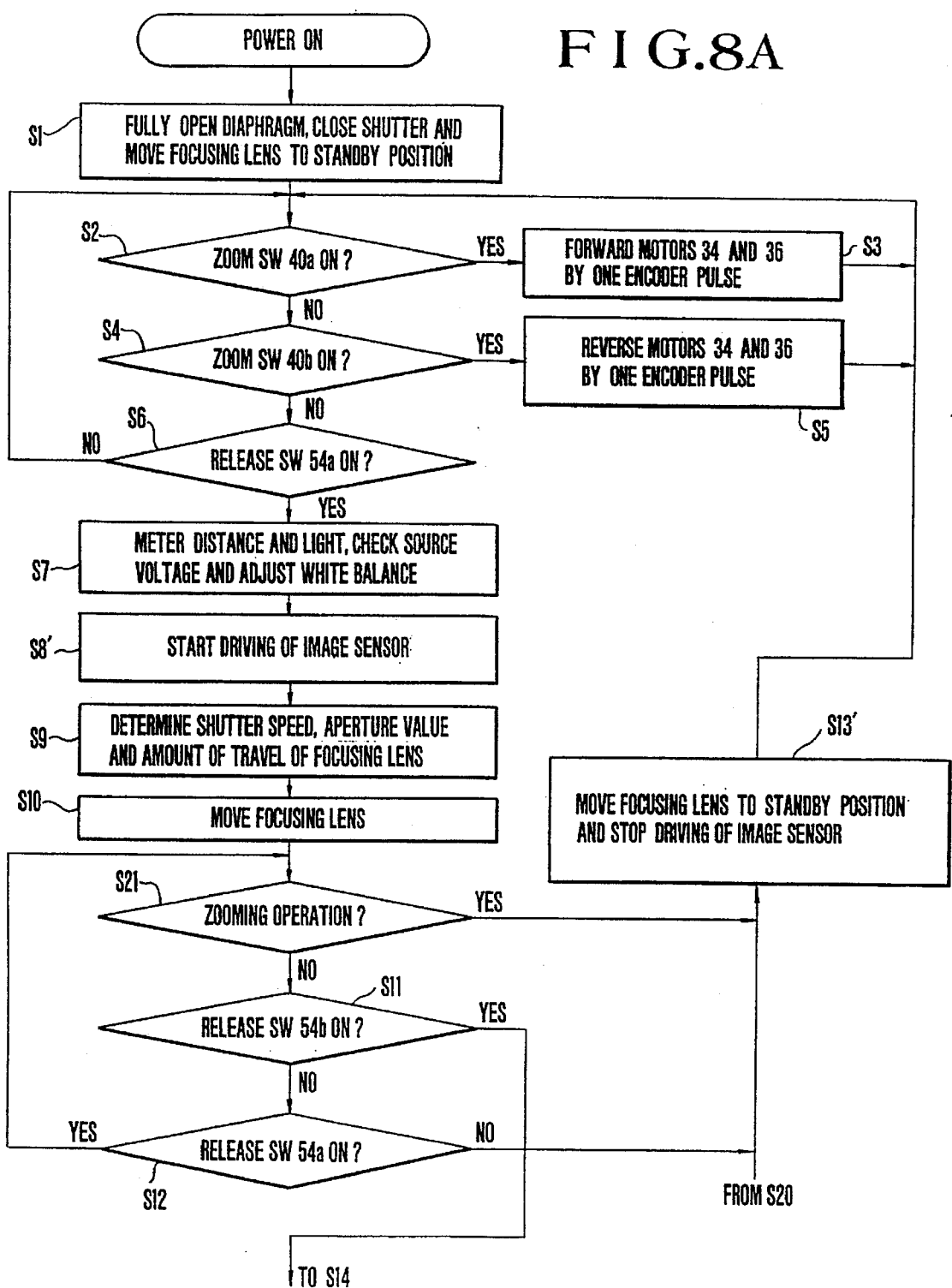

ELECTRONIC STILL CAMERA WITH TEMPORARILY HALTING AND RESTARTING OF OPTICAL SYSTEM CONTROL

This application is a division of application Ser. No. 08/394 069, filed Feb. 24, 1995, U.S. Pat. No. 5,523,784, which is a continuation of Ser. No. 08/261,747, filed Jun. 17, 1994, abandoned, which is a continuation of Ser. No. 08/134,472, filed Oct. 8, 1993, abandoned, which is a continuation of Ser. No. 07/999,194 filed Dec. 28, 1992, abandoned, which is a continuation of Ser. No. 07/646,695, filed Jan. 28, 1991, abandoned.

BACKGROUND OF THE INVENTION

1. Field of the Invention

The present invention relates generally to an electronic apparatus such as an electronic still camera and, more particularly, to an apparatus arranged to record a photographed image on, for example, a recording-medium which is rotating.

2. Description of the Related Art

It has previously been proposed to provide a so-called electronic still camera, that is, a still camera of the type arranged to form a still image on its solid-state image sensor such as a charge-coupled device (CCD) through a photographic operation and record the still image on a recording medium such as a magnetic disk. An arrangement in which a still image recorded on the magnetic disk is reproduced and displayed on a monitor or printed on paper by means of a printer is also known in the art.

As compared to a still camera of the conventional type employing a silver-salt photographic film, such as an electronic still camera, has the advantages of requiring no chemical treatment such as development, permitting a photographed image to be immediately viewed on a monitor or in the form of a hardcopy, and permitting a photographed image to be transmitted to a remote location.

However, the electronic still camera has a number of disadvantages. For example, a large amount of electrical power is consumed during the rotation of the magnetic disk for use as a recording medium or the driving of the image sensor. If an electrically-operated focal-length adjustment mechanism for adjusting the focal length of a photographic optical system is incorporated in the camera, an additional amount of electrical power will be consumed for a focal-length adjustment operation, and the source battery of the camera will be consumed within a short period.

If recording on or reproduction from the magnetic disk and adjustment of the focal length are simultaneously performed with the source battery consumed to some extent, the voltage of the source battery may temporarily become lower, with the result that variations may occur in the rotation of the magnetic disk, introducing a distortion into a recorded or reproduced image. This is a vital defect.

In addition, if the driving of the image sensor and the above-described focal-length adjustment operation are simultaneously performed, a problem will be encountered in which the image signal output from the image sensor undergoes a disturbance due to a decrease in the source voltage.

In a case where a single camera includes a plurality of circuits each consuming a large amount of electrical power when in operation, it is theoretically desirable to employ a battery having a fully large capacity. However, in practice, battery capacity and a space for housing the battery are limited.

SUMMARY OF THE INVENTION

It is, therefore, an object of the present invention to provide an electronic still camera in which the above-described problems are solved.

An electronic still camera according to one embodiment of the present invention includes a photographic optical system having a variable focal length, image sensing means for converting an optical image formed by the photographic optical system into an electrical image signal, recording means for recording on a rotary recording medium the electrical image signal produced by the image sensing means, focal-length adjusting means for adjusting the focal length of the photographic optical system, and controlling means arranged to inhibit either one of a rotation of the rotary recording medium and a focal-length adjustment operation of the focal-length adjusting means when the other is being performed.

An electronic still camera according to another embodiment is provided with controlling means for inhibiting initiation of the rotation of the rotary recording medium during the focal-length adjustment operation of the focal-length adjusting means.

An electronic still camera according to another embodiment is provided with controlling means for inhibiting initiation of the focal-length adjustment operation of the focal-length adjusting means during the rotation of the rotary recording medium.

In the above-described embodiments, a large amount of electrical power is consumed while the focal-length adjusting means is adjusting the focal length of the photographic optical system, as well as while the rotary recording medium is rotating. However, the controlling means allows only either of the focal-length adjusting means and the rotary recording medium to be set to an operating state in which a large amount of electrical power is consumed. Accordingly, since both the focal-length adjusting means and the rotary recording medium do not operate at the same time, no momentary demand for a large amount of electrical power takes place. If a large amount of electrical power is momentarily consumed, a source voltage lowers and variations may occur in the rotation of the rotary recording medium. However, with the above-described controlling means, it is possible to prevent occurrence of a lowering of the source voltage and, hence, the distortion of a recorded image due to variations in the rotation of the rotary recording medium.

An electronic still camera according to another embodiment of the present invention includes a photographic optical system having a variable focal length, image sensing means for converting an optical image formed by the photographic optical system into an electrical image signal, recording means for recording on a rotary recording medium the electrical image signal produced by the image sensing means, focal-length adjusting means for adjusting the focal length of the photographic optical system, and controlling means arranged to stop a focal-length adjustment operation of the focal-length adjusting means if the rotary recording medium initiates rotation while the focal-length adjusting means is adjusting the focal length of the photographic optical system.

In the aforesaid embodiment also, a large amount of electrical power is consumed while the focal-length adjusting means is adjusting the focal length of the photographic optical system, as well as while the rotary recording medium is rotating. However, upon initiation of the rotation of the rotary recording medium, that is, when a photographed image is to be recorded on the rotary recording medium, the controlling means inhibits the focal-length adjustment operation to prevent variations or a lowering in a source voltage due to the focal-length adjustment operation. Accordingly, the rotation of the rotary recording medium becomes stable and good image signals can be recorded.

An electronic still camera according to another embodiment includes a photographic optical system having a variable focal length, image sensing means for converting an optical image formed by the photographic optical system into an electrical image signal, recording means for recording on a rotary recording medium the electrical image signal produced by the image sensing means, focal-length adjusting means for adjusting the focal length of the photographic optical system, and controlling means arranged to stop a rotation of the rotary recording medium and start a focal-length adjustment operation of the focal-length adjusting means after completion of recording if the recording means is performing the recording on the rotary recording medium when an instruction indicative of execution of the focal-length adjustment operation is inputted during the rotation of the rotary recording medium, and to stop the rotation of the rotary recording medium and start the focal-length adjustment operation if the recording means is not performing the recording on the rotary recording medium when the instruction is inputted during the rotation of the rotary recording medium.

In the above-described arrangement, when the focal-length adjustment operation is ordered, if photographic recording is not being performed, the controlling means stops the rotation of the rotary recording medium and executes the focal-length adjustment operation. If photographic recording is being performed, the controlling means waits for the completion of photographic recording and initiates the focal-length adjustment operation. Accordingly, it is possible to efficiently utilize an electrical power source. Since no focal-length adjustment operation is executed during recording on the rotary recording medium, variations in the rotation of the rotary recording medium do not take place and it is possible to suppress recording distortion due to variations in the rotation of the rotary recording medium.

An electronic still camera according to another embodiment of the present invention includes a photographic optical system having a variable focal length, image sensing means for converting an optical image formed by the photographic optical system into an electrical image signal, recording means for recording on a recording medium the electrical image signal produced by the image sensing means, focal-length adjusting means for adjusting the focal length of the photographic optical system, and controlling means arranged to inhibit either one of the driving of the image sensing means and the movement of the optical system by the focal-length adjusting means when the other is being performed.

An electronic still camera according to another embodiment is provided with controlling means for inhibiting initiation of the driving of the image sensing means during the focal-length adjustment operation of the focal-length adjusting means.

An electronic still camera according to another embodiment is provided with controlling means for inhibiting initiation of the focal-length adjustment operation of the focal-length adjusting means during the driving of the image sensing means.

In the above-described embodiments, adjustment of the focal length of the photographic optical system by the focal-length adjusting means momentarily consumes a large amount of electrical power, and this consumption temporarily lowers a source voltage. A lowering of the source voltage makes the operation of the image sensing means unstable and causes a disturbance in an output image signal. However, the controlling means prevents simultaneous execution of the focal-length adjustment operation and the driving of the image sensing means, whereby the image sensing means can always stably operate. Accordingly, a good image signal free from disturbance can be obtained from the image sensing means. In addition, since the image sensing means and the focal-length adjusting means are prevented from simultaneously operating, an electrical power source having an excessively large capacity is not needed.

An electronic still camera according to another embodiment of the present invention includes a photographic optical system having a variable focal length, image sensing means for converting an optical image formed by the photographic optical system into an electrical image signal, recording means for recording on a rotary recording medium the electrical image signal produced by the image sensing means, focal-length adjusting means for adjusting the focal length of the photographic optical system, and controlling means arranged to start a focal-length adjustment operation of the focal-length adjusting means after completion of recording if a photographed image is being recorded when an instruction indicative of execution of the focal-length adjustment operation is inputted during the driving of the image sensing means, and to stop the driving of the image sensing means and start the focal-length adjustment operation if the photographed image is not being recorded when the instruction is inputted during the driving of the image sensing means.

In the above-described embodiment, adjustment of the focal length of the photographic optical system by the focal-length adjusting means momentarily consumes a large amount of electrical power, and this consumption temporarily lowers a source voltage. A lowering of the source voltage makes the operation of the image sensing means unstable and causes a disturbance in an output image signal. However, the controlling means prevents simultaneous execution of the focal-length adjustment operation and the driving of the image sensing means, whereby the image sensing means can always stably operate. Accordingly, a good image signal free from disturbance can be obtained from the image sensing means. In addition, since the image sensing means and the focal-length adjusting means are prevented from simultaneously operating, an electrical power source having an excessively large capacity is not needed.

An electronic still camera according to another embodiment of the present invention includes a photographic optical system having a variable focal length, image sensing means for converting an optical image formed by the photographic optical system into an electrical image signal, recording means for recording on a rotary recording medium the electrical image signal produced by the image sensing means, focal-length adjusting means for adjusting the focal length of the photographic optical system, and controlling means arranged to stop a focal-length adjustment operation of the focal-length adjusting means if driving of the image sensing means is initiated while the focal-length adjusting means is adjusting the focal length of the photographic optical system.

In the aforesaid embodiment also, a large amount of electrical power is consumed while the focal-length adjusting means is adjusting the focal length of the photographic optical system, and this consumption temporarily lowers a source voltage. A lowering of the source voltage makes the operation of the image sensing means unstable and causes a disturbance in an output image signal. However, the controlling means prevents simultaneous execution of the focal-length adjustment operation and the driving of the image sensing means, whereby the image sensing means can always stably operate. Accordingly, a good image signal free from disturbance can be obtained from the image sensing means. In addition, since the image sensing means and the focal-length adjusting means are prevented from simultaneously operating, an electrical power source having an excessively large capacity is not needed.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIGS. 4, 5A, 5B, 6, 7, 8A and 8B are flowcharts showing respectively the operations of other embodiments.

DETAILED DESCRIPTION OF THE PREFERRED EMBODIMENTS

Preferred embodiments of the present invention will be described below with reference to the accompanying drawings.

Figure 1:
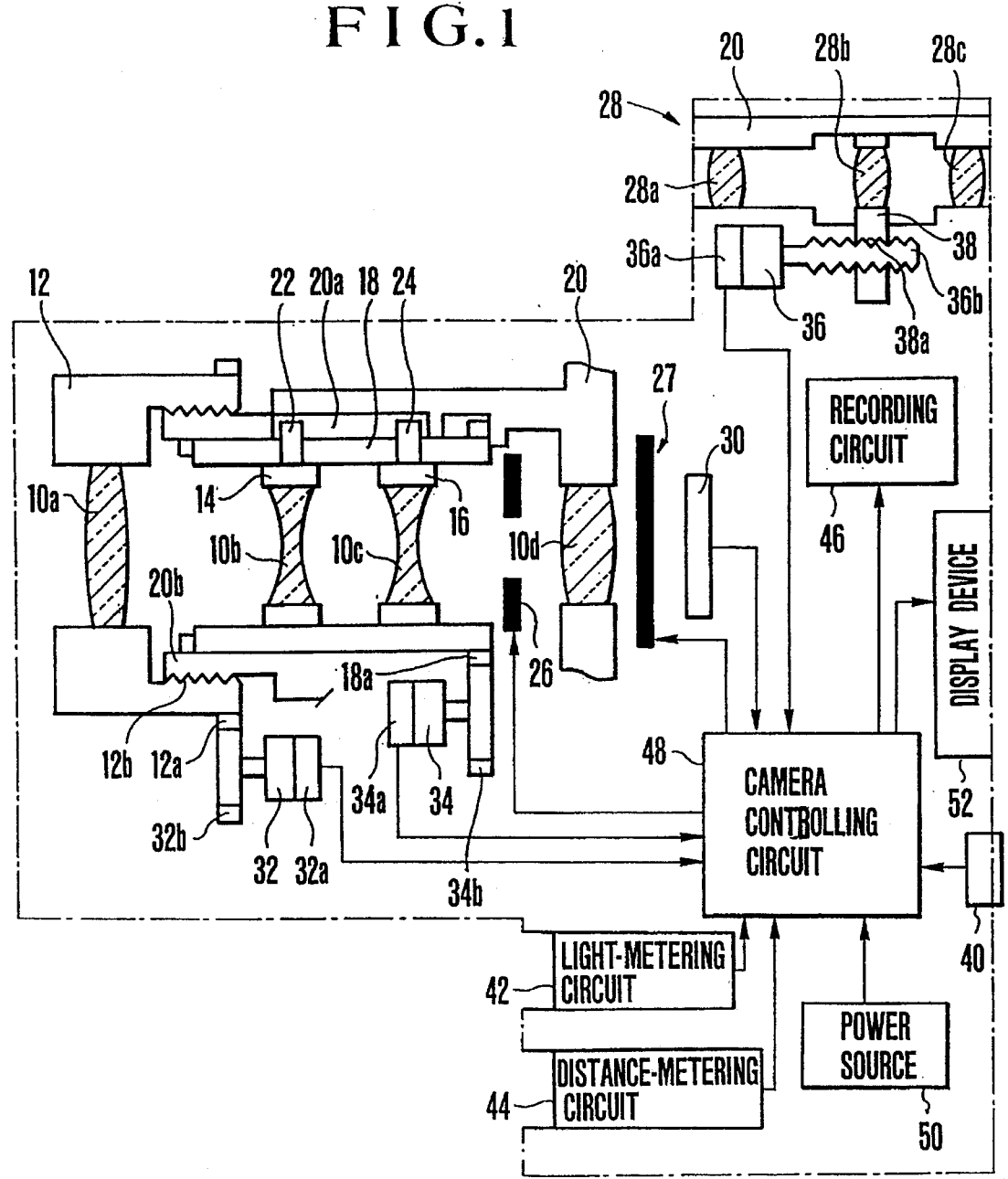
FIG. 1 is a block diagram showing the arrangement of one embodiment of the present invention.

FIG. 1 is a schematic block diagram of a first embodiment of the present invention. The electronic still camera according to the first embodiment comprises a focusing lens 10a, focal-length adjusting lenses 10b, 10c and a fixed lens 10d, which constitute in combination a photographic optical system; a focusing-lens holding frame 12 which holds the focusing lens 10a and which is provided with a gear portion 12a and a threaded portion 12b lens holding frames 14 and 16 which hold the focal-length adjusting lenses 10b and 10c, respectively; a cam tube 18 provided with cam slots which determine the positions of the lens holding frames 14 and 16 in the direction of the optical axis, the cam tube 18 being rotatably supported by a stationary portion 20 of the camera; and rollers 22 and 24 fixed to the respective lens holding frames 14 and 16. The rollers 22 and 24 are inserted through the respective cam slots of the cam tube 18 into an elongated groove 20a formed in the camera's stationary portion 20 along the optical axis, and position the respective holding frames 14 and 16. As the cam tube 18 rotates, the lens holding frames 14 and 16 move along the optical axis by means of the respective cam slots.

The illustrated electronic still camera also comprises a diaphragm 26, a shutter 27, a viewfinder optical system 28 and an image sensor 30 utilizing a CCD or the like for converting an optical image into an electrical image signal. The viewfinder optical system 28 includes lenses 28a and 28c fixed to the camera's stationary portion 20 as well as a lens 28b which is supported for movement along the optical axis defined by the lenses 28a and 28c.

The electronic still camera also comprises a focusing motor 32 for rotating the focusing-lens holding frame 12, and the number of revolutions of the motor 32 is detected by an encoder 32a. A gear 32b of the motor 32 is meshed with the gear portion 12a of the focusing-lens holding frame 12. The threaded portion 12b of the focusing-lens holding frame 12 is engaged with a threaded portion 20b of the camera's stationary portion 20 so that the focusing-lens holding frame 12 moves along the optical axis by the operation of the motor 32.

The electronic still camera also comprises a zooming motor 34, the number of revolutions of which is detected by an encoder 34a. A gear 34b of the motor 34 is meshed with a gear portion 18a of the cam tube 18. As the zooming motor 34 operates, the cam tube 18 rotates about the optical axis of the photographic optical system by means of the gear 34b and the gear portion 18a so that the focal-length adjusting lenses 10b and 10c move along the optical axis together with the lens holding frames 14 and 16 by the lifting operation of the respective cam slots.

The electronic still camera also comprises a viewfinder motor 36, the number of revolutions of which is detected by an encoder 36a. A gear 36b rotated by the motor 36 is meshed with a threaded portion 38a of a lens holding frame 38 which holds the movable lens 28b. The holding frame 28, hence the movable lens 28b, moves along the optical axis by the operation of the motor 36.

The electronic still camera also comprises a zoom button 40, a light-metering circuit 42, a distance-metering circuit 44, a recording circuit 46 for recording a photographed image on a recording medium, a camera controlling circuit 48 for controlling the entire camera, an electrical power source 50 such as a battery, a display device 52 (for example, a liquid-crystal display device) for displaying the state of operation.

Figure 2:
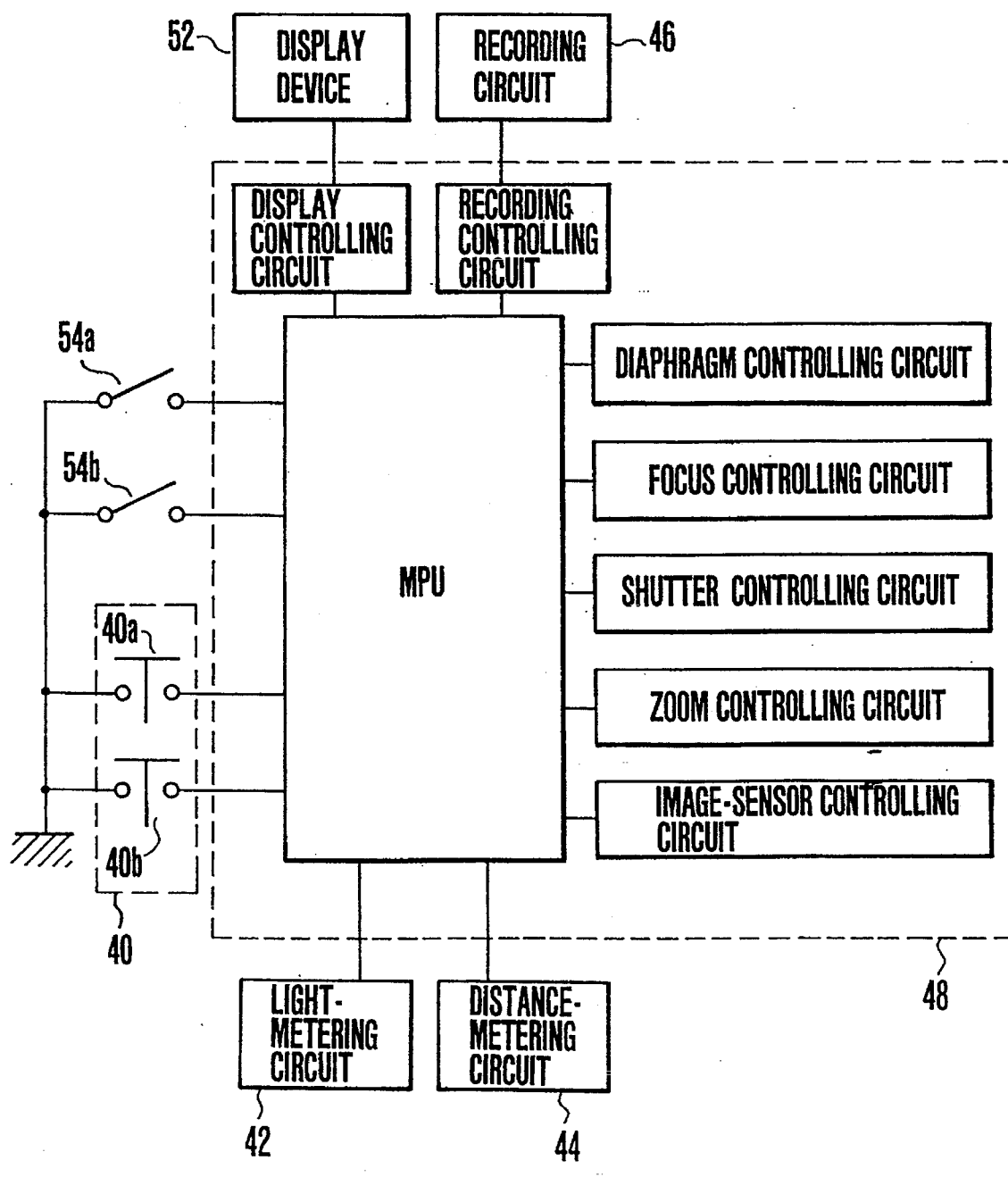
FIG. 2 is a block diagram showing the camera controlling circuit of FIG. 1 and its peripheral circuit arrangement.

As shown in FIG. 2, the camera controlling circuit 48 is provided with a shutter controlling circuit, a focus controlling circuit, a diaphragm controlling circuit, a zoom controlling circuit, an image-sensor controlling circuit and so on. In FIG. 2, a release switch 54a is turned on at a position where a shutter release button (not shown) is depressed by a half stroke, and a release switch 54b is turned on at a position where the shutter release button is further depressed. A zoom switch 40a is actuated to specify zooming toward a telephoto side, while a zoom switch 40b is actuated to specify zooming toward a wide-angle size.

Figure 3:
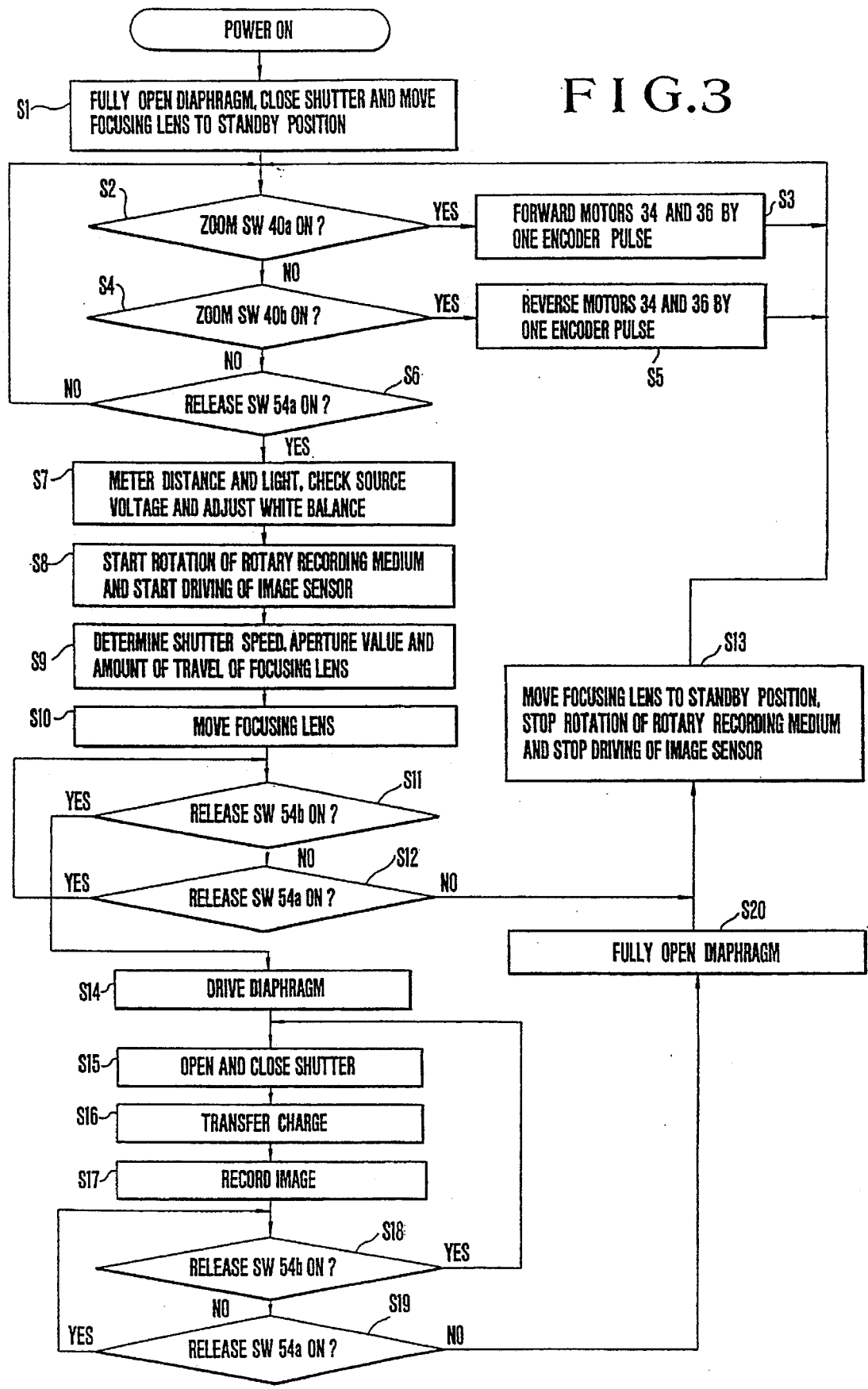
FIG. 3 is a flowchart showing the operation of the embodiment.

The operation of the first embodiment will be described below with reference to FIG. 3. When a power switch (not shown) is actuated to supply electrical power from the electrical power source 50, the camera controlling circuit 48 fully opens the diaphragm 26, closes the shutter 27, and moves the focusing lens 10a to a position where infinity is in focus (Step S1). A photographer determines a desired composition in this state, that is, presses either of the switches 40a and 40b of the zoom button 40 while viewing through the viewfinder. If the switch 40a is pressed (Step S2), the motors 34 and 36 are driven forward to shift the photographic optical system and the viewfinder optical system toward the telephoto side (Step S3). If the switch 40b is pressed (Step S4), the motors 34 and 36 are driven backward to shift the photographic optical system and the viewfinder optical system toward the wide-angel side (Step S5).

After the desired composition has been determined in the above-described manner, the photographer presses the shutter release button (not shown). When the shutter release button is depressed by a half stroke and the release switch 54a is turned on (Step S6), the camera controlling circuit 48 meters the luminance of a subject through the light-metering circuit 42, meters the distance to the subject through the distance-metering circuit 44, and adjusts white balance (Step S7). Subsequently, the camera controlling circuit 48 causes the rotary recording medium (not shown) of the recording circuit 46 to initiate rotation to put it on standby for image recording, and initiates driving of the image sensor 30 (Step S8). The camera controlling circuit 48 determines an aperture value and a shutter speed on the basis of metered-light information and the amount of travel of the focusing lens 10a on the basis of metered-distance information (Step S9), and moves the focusing lens 10a to the determined position through the motor 32 (Step S10).

After Step 10, while the release switch 54a is on, the process waits for the shutter release button to be further depressed to turn on the release switch 54b (Steps S11 and S12). If the release switch 54a is turned off (Step S12), this indicates that no photography is performed. Accordingly, the focusing lens 10a is moved to a predetermined standby position (infinity focus position), and the rotation of the rotary recording medium and the driving of the image sensor 30 are stopped (Step S13). The process then returns to Step S2. If the release switch 54b is turned on, a photographic operation is initiated. The diaphragm 26 is driven so that the aperture value determined in Step S9 is set (Step S14), and the shutter 27 is made open for the determined shutter time only (Step S15). The charge stored in the image sensor 30 by the opening and closure of the shutter 27 is read out and transferred to the recording circuit 46 (Step S16), and the photographed image is recorded on an unrecorded area of the rotary recording medium (Step S17).

Subsequently, if the release switch 54b remains on, photography and recording (Steps S15 to S17) are repeated (Step S18). If the release switch 54b is turned off with the switch 54a remaining on (Step S19), the focusing lens 10a is stopped at this point in time, the rotary recording medium is kept rotating and the image sensor 30 is held in a driven state. In this state, the process waits for the switch 54b to be turned on (Step S19). If the switch 54a is turned off, the diaphragm 26 is fully opened (Step S20). Then, the focusing lens 10a is moved to the predetermined standby position (infinity focus position) and the rotation of the rotary recording medium and the driving of the image sensor 30 are stopped (Step S13), thus completing the photographic operation.

In the first embodiment, while the focal lengths of the photographic optical system and the viewfinder optical system are being adjusted through the zoom button 40 (the switch 40a or 40b), the rotary recording medium of the recording circuit 46 is kept stationary. During the rotation of the rotary recording medium, even if the zoom button 40 is pressed, movement of the optical systems for the purpose of focal-length adjustment is not performed. Although the above explanation refers to a photographic (recording) operation only, a reproducing operation may also be controlled in a similar manner. For example, in the case of an electronic still camera provided with a reproducing circuit, while a rotary recording medium is being rotated for reproduction of a recorded image, movement of the optical systems for the purpose of focal-length adjustment is inhibited even if a zoom button is pressed.

Although the above-described first embodiment employs a zoom lens system whose focal length can be continuously varied, the above-described first embodiment is similarly applicable to a lens system having two or more particular focal lengths which can be selectively set. As a matter of course, the arrangement of a lens (a lens group) to be moved for focusing purpose is not limited to the shown example. If lenses (a lens arrangement) for focal-length adjustment, or a variable-power lens arrangement, is to be used as a focusing lens, each lens group of the variable-power lens arrangement may be independently moved along the optical axis, and it may be necessary to independently control the movement of each lens group. A mechanism for realizing this control is disclosed in, for example, U.S. Pat. No. 4,008,951.

As can be readily understood from the foregoing description, according to the first embodiment, if either of two circuit mechanisms having high power consumption requires a supply of electrical power, the supply of electrical power to the other can be reduced to zero or a minimum amount. Accordingly, an electrical power source can be efficiently utilized and it is possible to prevent image distortion due to variations in the rotation of the rotary recording medium.

A second embodiment of the present invention will be described below.

The construction of the second embodiment is substantially identical to those shown in FIGS. 1 and 2, and its operation merely differs as explained below.

Figure 4:
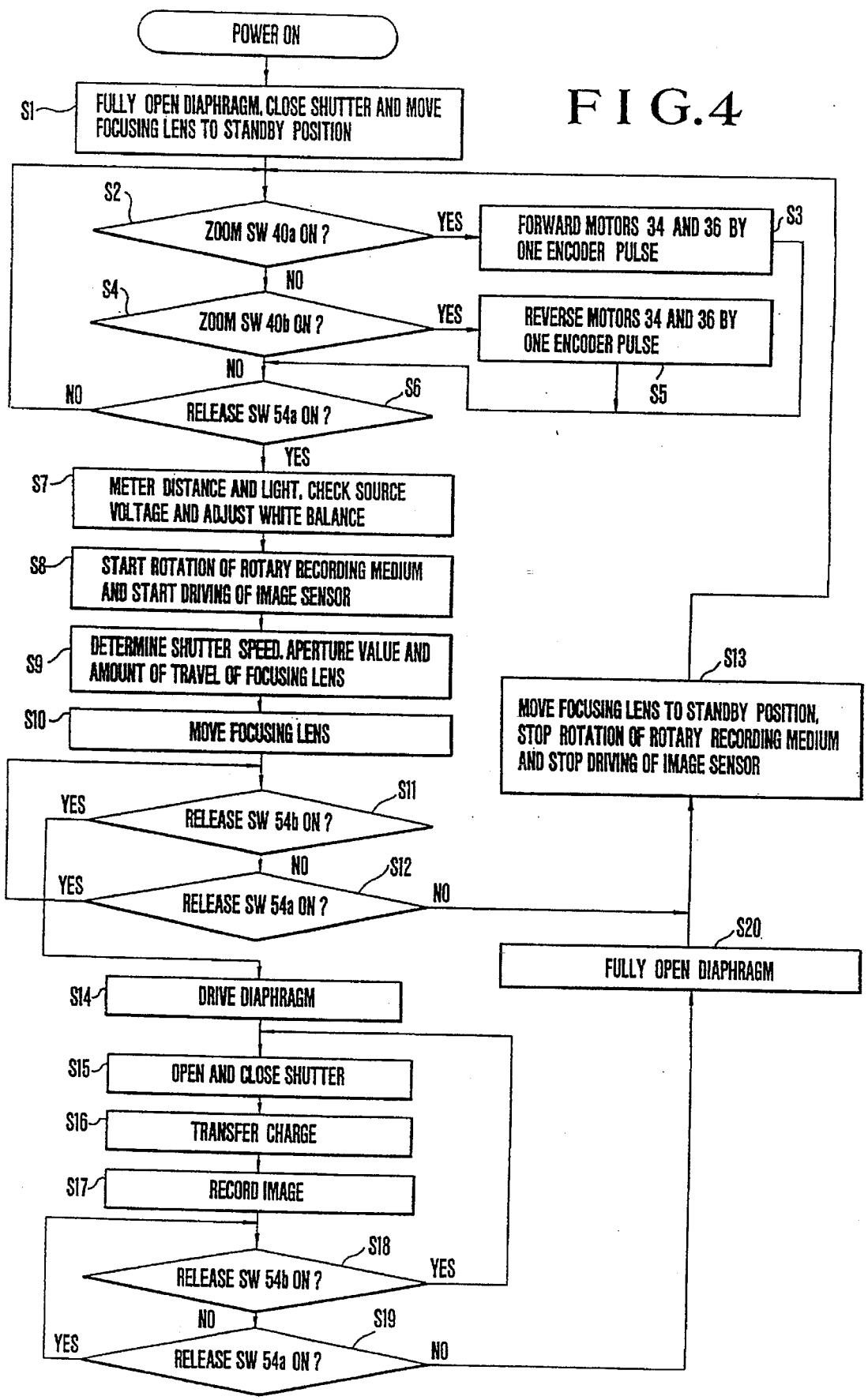

The operation of the second embodiment will now be described with reference to FIG. 4.

When the power switch (not shown) is actuated to supply electrical power from the electrical power source 50, the camera controlling circuit 48 fully opens the diaphragm 26, closes the shutter 27, and moves the focusing lens 10a to a position where infinity is in focus (Step S1). A photographer determines a desired composition in this state, that is, presses either of the switches 40a and 40b of the zoom button 40 while viewing through the viewfinder. If the switch 40a is pressed (Step S2), the motors 34 and 36 are driven forward to shift the photographic optical system and the viewfinder optical system toward the telephoto side (Step S3). If the switch 40b is pressed (Step S4) the motors 34 and 36 are driven backward to shift the photographic optical system and the viewfinder optical system toward the wide-angle side (Step S5).

After the desired composition has been determined in the above-described manner, the photographer presses the shutter release button (not shown). When the shutter release button is depressed by a half stroke and the release switch 54a is turned on (Step S6), the camera controlling circuit 48 meters the luminance of a subject through the light-metering circuit 42, meters the distance to the subject through the distance-metering circuit 44, and adjusts white balance (Step S7). Subsequently, the camera controlling circuit 48 causes the rotary recording medium of the recording circuit 46 to initiate rotation to put it on standby for image recording, and initiates driving of the image sensor 30 (Step S8). The camera controlling circuit 48 determines an aperture value and a shutter speed on the basis of metered-light information and the amount of travel of the focusing lens 10a on the basis of metered-distance information (Step S9), and moves the focusing lens 10a to the determined position through the motor 32 (Step S10).

After Step 10, while the release switch 54a is on, the process waits for the shutter release button to be further depressed to turn on the release switch 54b (Steps S11 and S12). If the release switch 54a is turned off (Step S12), this indicates that no photography is performed. Accordingly, the focusing lens 10a is moved to a predetermined standby position (infinity focus position), and the rotation of the rotary recording medium and the driving of the image sensor 30 are stopped (Step S13). The process then returns to Step S2. If the release switch 54b is turned on, a photographic operation is initiated. The diaphragm 26 is driven so that the aperture value determined in Step S9 is set (Step S14), and the shutter 27 is made open for the determined shutter time only (Step S15). The charge stored in the image sensor 30 by the opening and closure of the shutter 27 is read out and transferred to the recording circuit 46 (Step S16), and the photographed image is recorded on an unrecorded area of the rotary recording medium (Step S17).

Subsequently, if the release switch 54b remains on, photography and recording (Steps S15 to S17) are repeated (Step S18). If the release switch 54b is turned off with the switch 54a remaining on (Step S19), the focusing lens 10a is stopped at this point in time, the rotary recording medium is kept rotating and the image sensor 30 is held in a driven state. In this state, the process waits for the switch 54b to be turned on (Step S19). If the switch 54a is turned off, the diaphragm 26 is fully opened (Step S20). Then, the focusing lens 10a is moved to the predetermined standby position (infinity focus position) and the rotation of the rotary recording medium and the driving of the image sensor 30 are stopped (Step S13), thus completing the photographic operation.

In the second embodiment, when the focal lengths of the photographic optical system and the viewfinder optical system are being adjusted through the zoom button 40 (the switch 40a or 40b), if rotation of the rotary recording medium of the recording circuit 46 is started, focal-length adjustment is stopped. During the rotation of the rotary recording medium, even if the zoom button 40 is pressed, movement of the optical systems for the purpose of focal-length adjustment is not performed.

Although the above-described second embodiment employs a zoom lens system whose focal length can be continuously varied, the above-described second embodiment is similarly applicable to a lens system having two or more particular focal lengths which can be selectively set. As a matter of course, the arrangement of a lens (a lens group) to be moved for focusing purpose is not limited to the shown example. If lenses (a lens arrangement) for focal-length adjustment, or a variable-power lens arrangement, is to be used as a focusing lens, each lens group of the variable-power lens arrangement may be independently moved along the optical axis, and it may be necessary to independently control the movement of each lens group. A mechanism for realizing this control is disclosed in, for example, U.S. Pat. No. 4,008,951.

As can be readily understood from the foregoing description, according to the second embodiment, if the rotation of the rotary recording medium is started during adjustment of the focal length of the photographic optical system, the focal-length adjustment operation is stopped. Accordingly, variations in the rotation of the rotary recording medium do not take place and it is possible to prevent image distortion due to variations in the rotation of the rotary recording medium. In addition, since two circuit mechanisms having high power consumption are inhibited from simultaneous employing large electrical power, an electrical power source can be efficiently utilized.

A third embodiment of the present invention will be described below.

The construction of the third embodiment is substantially identical to those shown in FIGS. 1 and 2, and its operation merely differs as explained below.

Figure 5A:
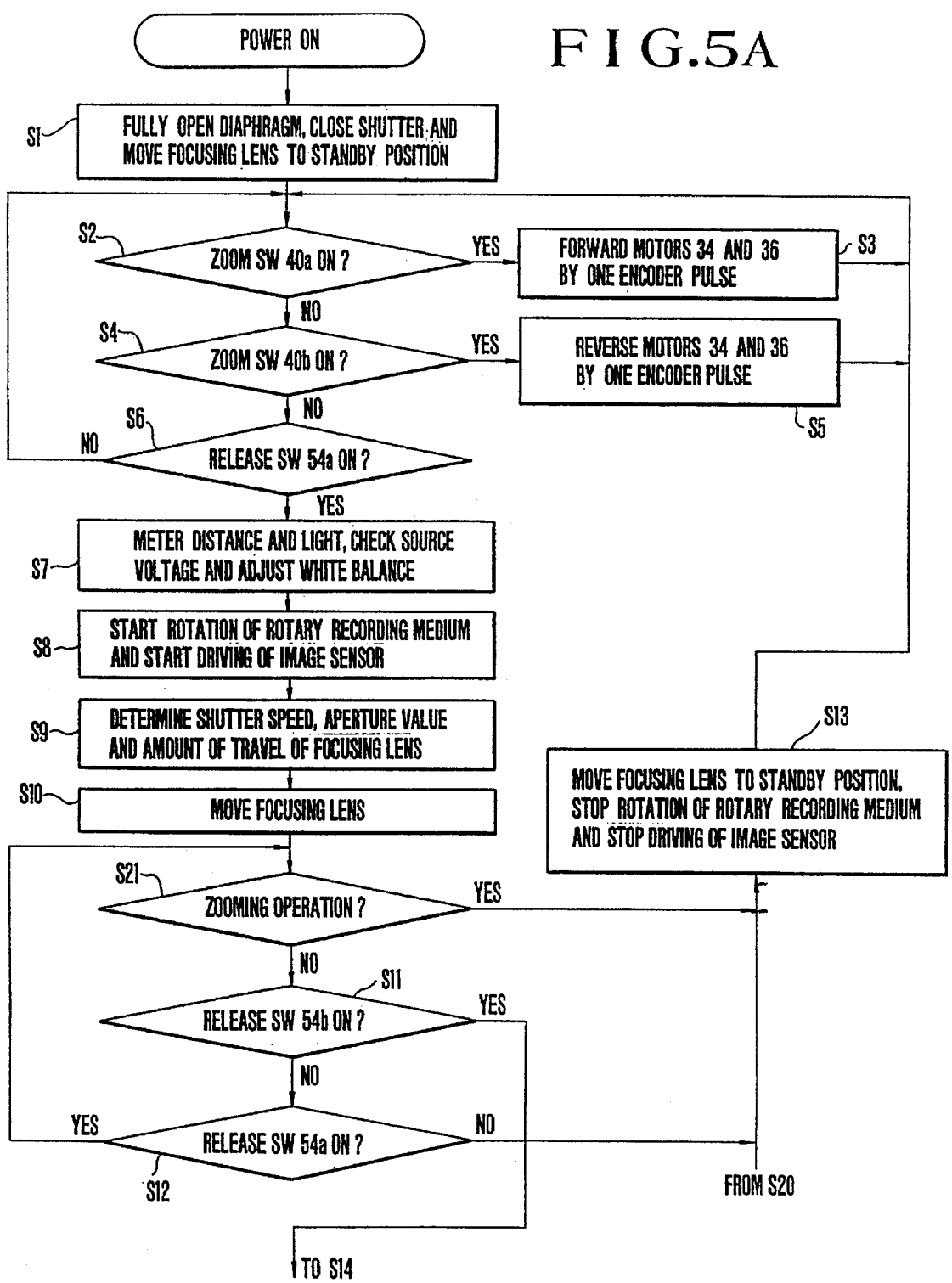
Figure 5B:
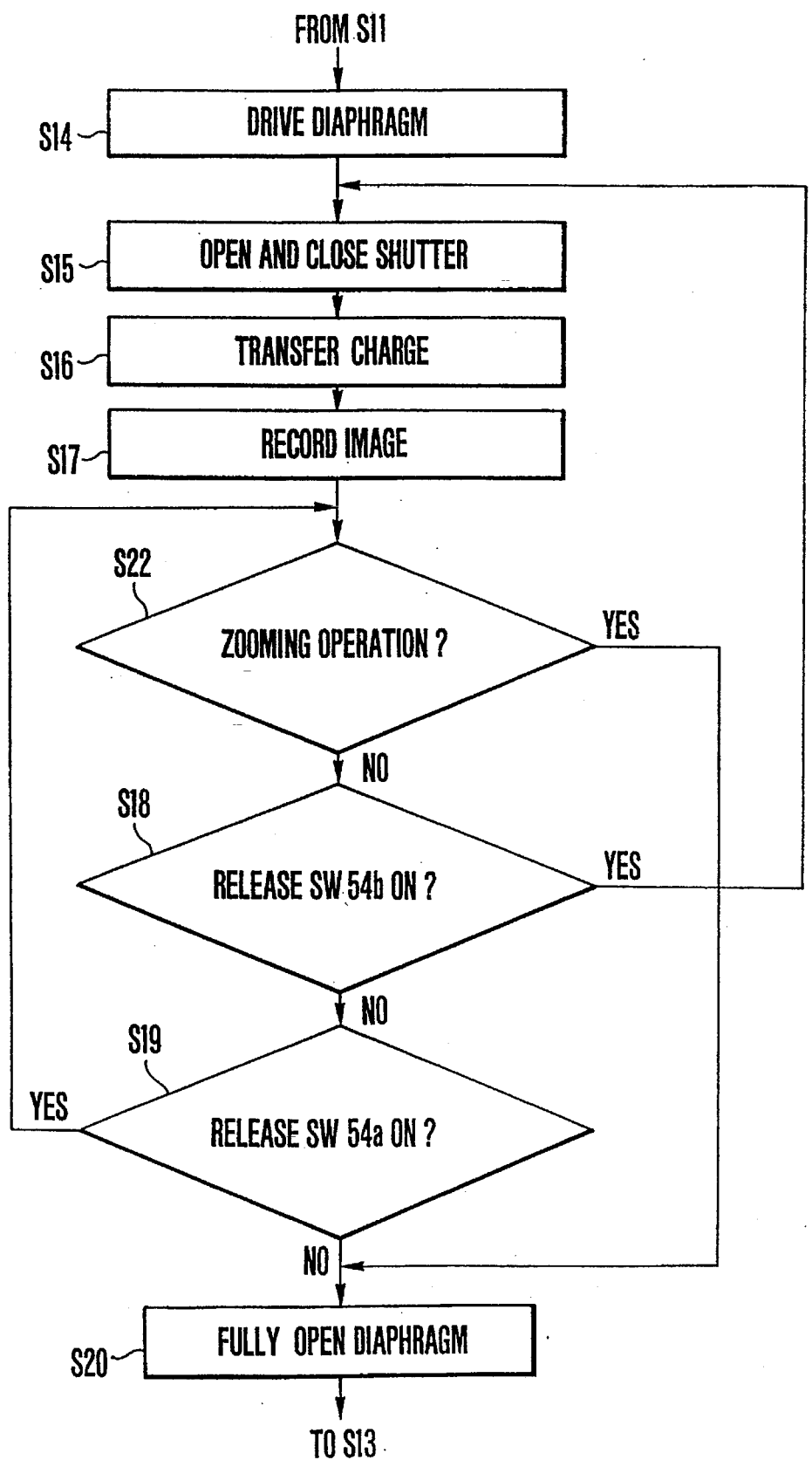

The operation of the third embodiment will now be described with reference to FIGS. 5A and 5B.

When the power switch (not shown) is actuated to supply electrical power from the electrical power source 50, the camera controlling circuit 48 fully opens the diaphragm 26, closes the shutter 27, and moves the focusing lens 10a to a position where infinity is in focus (Step S1). A photographer determines a desired composition in this state, that is, presses either of the switches 40a and 40b of the zoom button 40 while viewing through the viewfinder. If the switch 40a is pressed (Step S2), the motors 34 and 36 are driven forward to shift the photographic optical system and the viewfinder optical system toward the telephoto side (Step S3). If the switch 40b is pressed (Step S4), the motors 34 and 36 are driven backward to shift the photographic optical system and the viewfinder optical system toward the wide-angle side (Step S5).

After the desired composition has been determined in the above-described manner, the photographer presses the shutter release button (not shown). When the shutter release button is depressed by a half stroke and the release switch 54a is turned on (Step S6), the camera controlling circuit 48 meters the luminance of a subject through the light-metering circuit 42, meters the distance to the subject through the distance-metering circuit 44, and adjusts white balance (Step S7). Subsequently, the camera controlling circuit 48 causes the rotary recording medium of the recording circuit 46 to initiate rotation to put it on standby for image recording, and initiates driving of the image sensor 30 (Step S8). The camera controlling circuit 48 determines an aperture value and a shutter speed on the basis of metered-light information and the amount of travel of the focusing lens 10a on the basis of metered-distance information (Step S9), and moves the focusing lens 10a to the determined position through the motor 32 (Step S10).

After Step 10, while the release switch 54a is on, the state of the zoom button 40 (Step S21) or that of the release switch 54b is identified. If the zoom button 40 is actuated (Step S21), the focusing lens 10a is moved to a predetermined standby position (infinity focus position), and the rotation of the rotary recording medium and the driving of the image sensor 30 are stopped (Step S13). The process then returns to Step S2. While the release switch 54a is on, the process waits for the shutter release button to be further depressed to turn on the release switch 54b (Steps S11 and S12). If the release switch 54a is turned off (Step S12), this indicates that no photography is performed. Accordingly, the focusing lens 10a is moved to a predetermined standby position (infinity focus position), and the rotation of the rotary recording medium and the driving of the image sensor 30 are stopped (Step S13). The process then returns to Step S2. If the release switch 54b is turned on, a photographic operation is initiated. The diaphragm 26 is driven so that the aperture value determined in Step S9 is set (Step S14), and the shutter 27 is made open for the determined shutter time only (Step S15). The charge stored in the image sensor 30 by the opening and closure of the shutter 27 is read out and transferred to the recording circuit 46 (Step S16), and the photographed image is recorded on an unrecorded area of the rotary recording medium (Step S17).

Subsequently, if the switch 54a is off (Step S19), the states of the zoom button 40 and the release switch 54b are identified (Steps S22 and S18). If the zoom button 40 is actuated, the aperture is fully opened (Step S13) and the process proceeds to Step S20. If the release switch 54b remains on, photography and recording (Steps S15 to S17) are repeated (Step S18). If the release switch 54b is turned off with the switch 54a remaining on, the focusing lens 10a is stopped at this point in time, the rotary recording medium is kept rotating and the image sensor 30 is held in a driven state. If the switch 54a is turned off, the diaphragm 26 is fully opened (Step S20). Then, the focusing lens 10a is moved to the predetermined standby position (infinity focus position) and the rotation of the rotary recording medium and the driving of the image sensor 30 are stopped (Step S13), thus completing the photographic operation.

In the third embodiment, when the focal lengths of the photographic optical system and the viewfinder optical system are being adjusted through the zoom button 40 (the switch 40a or 40b), the rotary recording medium of the recording circuit 46 is kept stationary. Even if the zoom button 40 is pressed during the rotation of the rotary recording medium, the rotation of the optical systems for the purpose of focal-length adjustment is stopped if the camera is not in a photographic recording state. However, if a photographic recording operation is being executed, the focal-length adjustment operation of the photographic optical system is inhibited until the photographic recording operation is completed. When the photographic recording operation is completed, the focal-length adjustment operation of the photographic optical system is started and the rotation of the rotary recording medium is stopped. As a matter of course, during the photographic recording operation, the rotary recording medium rotates at a predetermined speed.

Although the above-described third embodiment employs a zoom lens system whose focal length can be continuously varied, the above-described third embodiment is similarly applicable to a lens system having two or more particular focal lengths which can be selectively set. As a matter of course, the arrangement of a lens (a lens group) to be moved for focusing purpose is not limited to the shown example. If lenses (a lens arrangement) for focal-length adjustment, or a variable-power lens arrangement, is to be used as a focusing lens, each lens group of the variable-power lens arrangement may be independently moved along the optical axis, and it may be necessary to independently control the movement of each lens group. A mechanism for realizing this control is disclosed in, for example, U.S. Pat. No. 4,008,951.

As can be readily understood from the foregoing description, according to the third embodiment, since no focal-length adjustment operation is executed during the rotation of the rotary recording medium, it is possible to efficiently utilize an electrical power source. Since no focal-length adjustment operation is executed during recording on the rotary recording medium, variations in the rotation of the rotary recording medium do not take place and it is possible to prevent image distortion due to variations in the rotation of the rotary recording medium.

A fourth embodiment of the present invention will be described below.

The construction of the fourth embodiment is substantially identical to those shown in FIGS. 1 and 2, and its operation merely differs as explained below.

Figure 6:
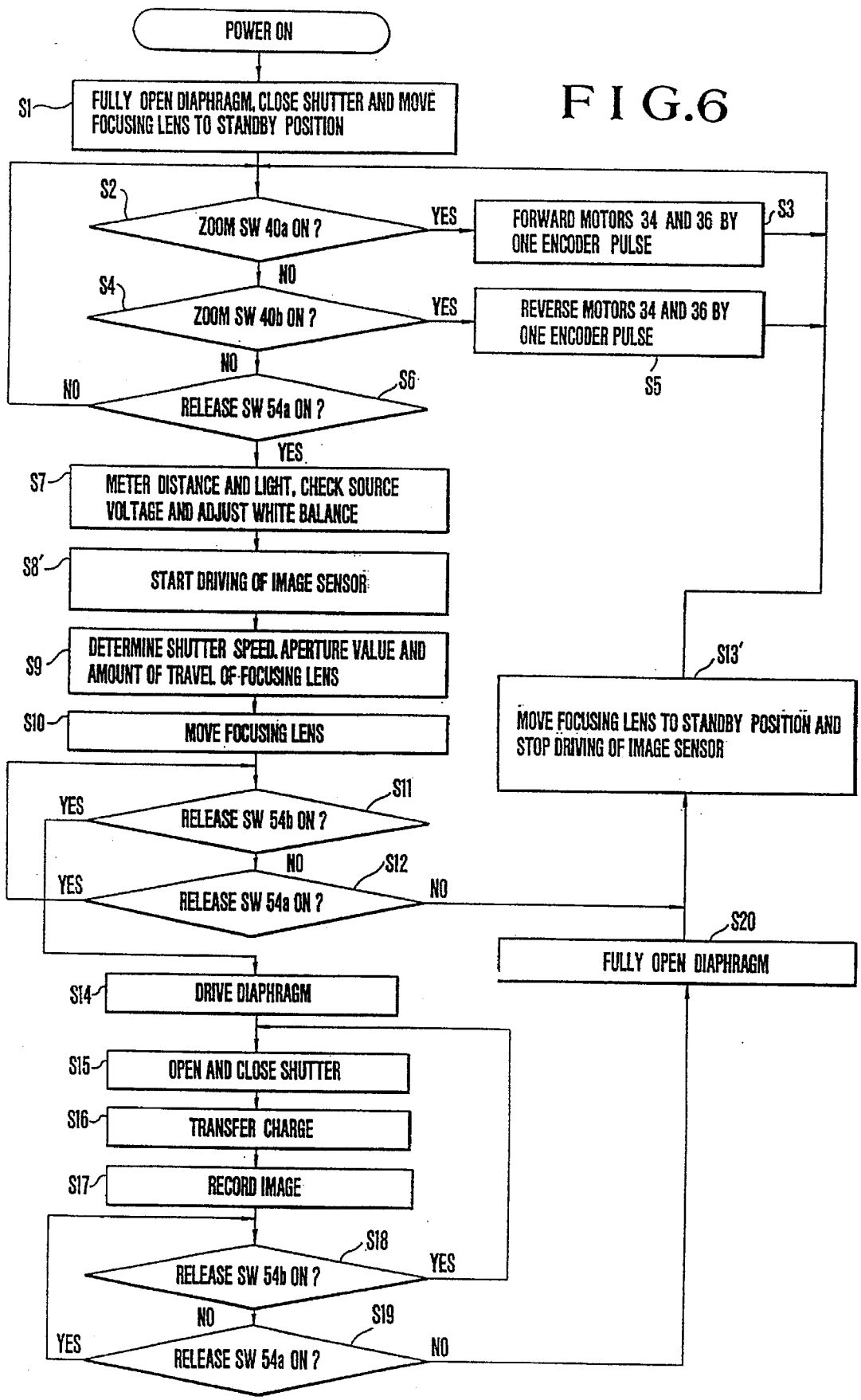

The operation of the fourth embodiment will now be described with reference to FIG. 6.

When the power switch (not shown) is actuated to supply electrical power from the electrical power source 50, the camera controlling circuit 48 fully opens the diaphragm 26, closes the shutter 27, and moves the focusing lens 10a to a position where infinity is in focus (Step S1). A photographer determines a desired composition in this state, that is, presses either of the switches 40a and 40b of the zoom button 40 while viewing through the viewfinder. If the switch 40a is pressed (Step S2), the motors 34 and 36 are driven forward to shift the photographic optical system and the viewfinder optical system toward the telephoto side (Step S3). If the switch 40b is pressed (Step S4), the motors 34 and 36 are driven backward to shift the photographic optical system and the viewfinder optical system toward the wide-angle side (Step S5).

After the desired composition has been determined in the above-described manner, the photographer presses the shutter release button (not shown). When the shutter release button is depressed by a half stroke and the release switch 54a is turned on (Step S6), the camera controlling circuit 48 meters the luminance of a subject through the light-metering circuit 42, meters the distance to the subject through the distance-metering circuit 44, and adjusts white balance (Step S7). Subsequently, the camera controlling circuit 48 initiates driving of the image sensor 30 (Step S8'). The camera controlling circuit 48 determines an aperture value and a shutter speed on the basis of metered-light information and the amount of travel of the focusing lens 10a on the basis of metered-distance information (Step S9), and moves the focusing lens 10a to the determined position through the motor 32 (Step S10).

After Step 10, while the release switch 54a is on, the process waits for the shutter release button to be further depressed to turn on the release switch 54b (Steps S11 and S12). If the release switch 54a is turned off (Step S12), this indicates that no photography is performed. Accordingly, the focusing lens 10a is moved to a predetermined standby position (infinity focus position), and the driving of the image sensor 30 is stopped (Step S13'). The process then returns to Step S2. If the release switch 54b is turned on, a photographic operation is initiated. The diaphragm 26 is driven so that the aperture value determined in Step S9 is set (Step S14), and the shutter 27 is made open for the determined shutter time only (Step S15). The charge stored in the image sensor 30 by the opening and closure of the shutter 27 is read out and transferred to the recording circuit 46 (Step S16), and the photographed image is recorded on an unrecorded area of the rotary recording medium (Step S17).

Subsequently, if the release switch 54b remains on, photography and recording (Steps S15 to S17) are repeated (Step S18). If the release switch 54b is turned off with the switch 54a remaining on (Step S19), the focusing lens 10a is stopped at this point in time and the image sensor 30 is held in a driven state. In this state, the process waits for the switch 54b to be turned on (Step S19). If the switch 54a is turned off, the diaphragm 26 is fully opened (Step S20). Then, the focusing lens 10a is moved to the predetermined standby position (infinity focus position) and the driving of the image sensor 30 is stopped (Step S13'), thus completing the photographic operation.

In the fourth embodiment, while the focal lengths of the photographic optical system and the viewfinder optical system are being adjusted through the zoom button 40 (the switch 40a or 40b), even if driving of the image sensor 30 is to be started, such driving is inhibited. Even if the zoom button 40 is pressed during the driving of the image sensor 30, movement of the optical systems for the purpose of focal-length adjustment is inhibited.

As a matter of course, the recording medium for recording a photographed image may be a solid-state memory such as a semiconductor memory.

Although the above-described fourth embodiment employs a zoom lens system whose focal length can be continuously varied, the above-described fourth embodiment is similarly applicable to a lens system having two or more particular focal lengths which can be selectively set. As a matter of course, the arrangement of a lens (a lens group) to be moved for focusing purpose is not limited to the shown example. If lenses (a lens arrangement) for focal-length adjustment, or a variable-power lens arrangement, is to be used as a focusing lens, each lens group of the variable-power lens arrangement may be independently moved along the optical axis, and it may be necessary to independently control the movement of each lens group. A mechanism for realizing this control is disclosed in, for example, U.S. Pat. No. 4,008,951.

As can be readily understood from the foregoing description, according to the fourth embodiment, since the driving of the image sensor and the focal-length adjustment of the photographic optical system are not simultaneously performed, the operation of the image sensor is not adversely affected by variations of source voltage due to focal-length adjustment, whereby good image signals can be obtained. It is also possible to efficiently utilize the electrical power source of a camera.

A fifth embodiment of the present invention will be described below.

The construction of the fifth embodiment is substantially identical to those shown in FIGS. 1 and 2, and its operation merely differs as explained below.

Figure 7:
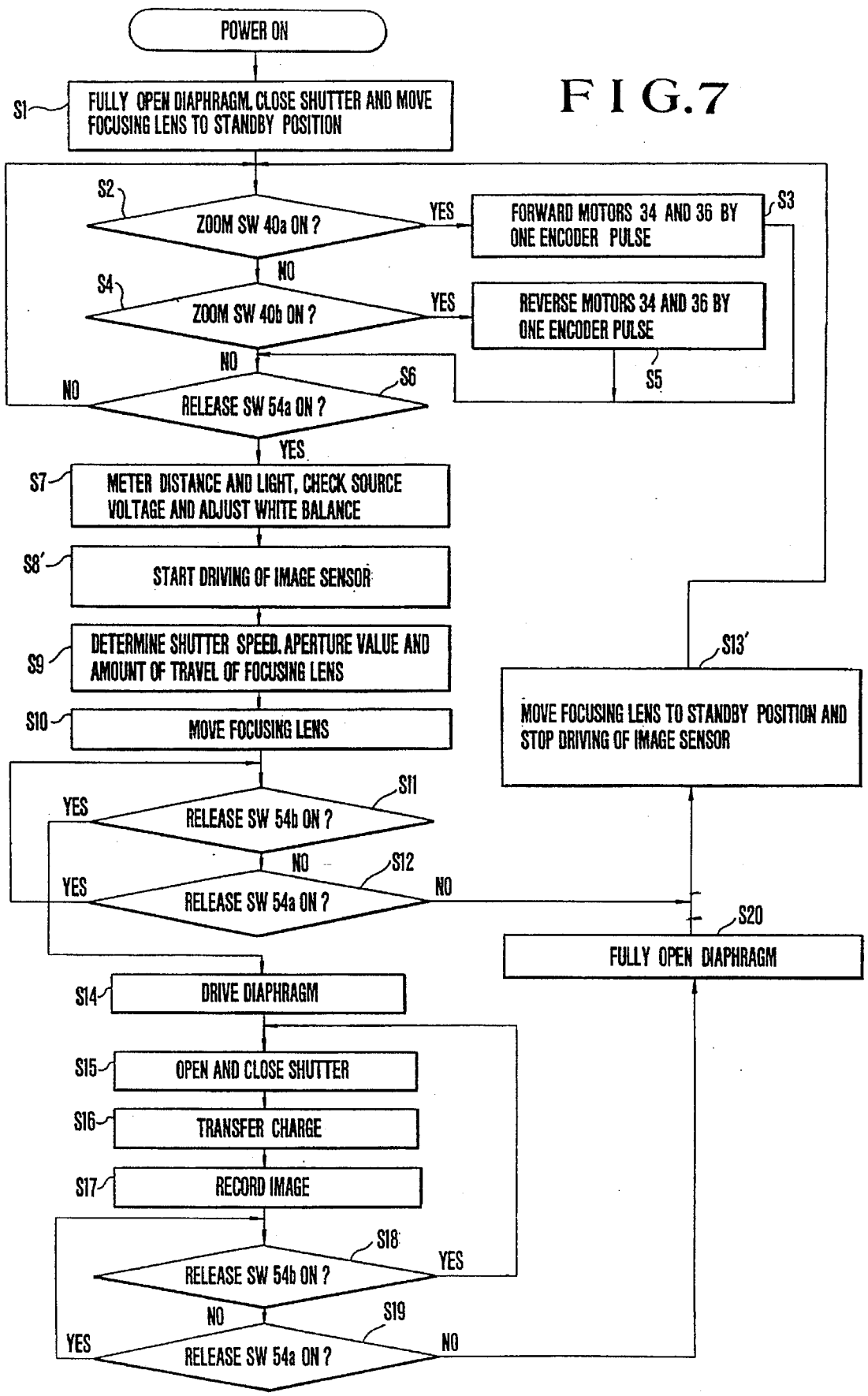

The operation of the fifth embodiment will now be described with reference to FIG. 7.

When the power switch (not shown) is actuated to supply electrical power from the electrical power source 50, the camera controlling circuit 48 fully opens the diaphragm 26, closes the shutter 27, and moves the focusing lens 10a to a position where infinity is in focus (Step S1). A photographer determines a desired composition in this state, that is, presses either of the switches 40a and 40b of the zoom button 40 while viewing through the viewfinder. If the switch 40a is pressed (Step S2), the motors 34 and 36 are driven forward to shift the photographic optical system and the viewfinder optical system toward the telephoto side (Step S3). If the switch 40b is pressed (Step S4), the motors 34 and 36 are driven backward to shift the photographic optical system and the viewfinder optical system toward the wide-angle side (Step S5).

After the desired composition has been determined in the above-described manner, the photographer presses the shutter release button (not shown). When the shutter release button is depressed by a half stroke and the release switch 54a is turned on (Step S6), the camera controlling circuit 48 meters the luminance of a subject through the light-metering circuit 42, meters the distance to the subject through the distance-metering circuit 44, and adjusts white balance (Step S7). Subsequently, the camera controlling circuit 48 initiates driving of the image sensor 30 (Step S8'). The camera controlling circuit 48 determines an aperture value and a shutter speed on the basis of metered-light information and the amount of travel of the focusing lens 10a on the basis of metered-distance information (Step S9), and moves the focusing lens 10a to the determined position through the motor 32 (Step S10).

After Step 10, while the release switch 54a is on, the process waits for the shutter release button to be further depressed to turn on the release switch 54b (Steps S11 and S12). If the release switch 54a is turned off (Step S12), this indicates that no photography is performed. Accordingly, the focusing lens 10a is moved to a predetermined standby position (infinity focus position), and the driving of the image sensor 30 is stopped (Step S13'). The process then returns to Step S2. If the release switch 54b is turned on, a photographic operation is initiated. The diaphragm 26 is driven so that the aperture value determined in Step S9 is set (Step S14), and the shutter 27 is made open for the determined shutter time only (Step S15). The charge stored in the image sensor 30 by the opening and closure of the shutter 27 is read out and transferred to the recording circuit 46 (Step S16), and the photographed image is recorded on an unrecorded area of the rotary recording medium (Step S17).

Subsequently, if the release switch 54b remains on, photography and recording (Steps S15 to S17) are repeated (Step S18). If the release switch 54b is turned off with the switch 54a remaining on (Step S19), the focusing lens 10a is stopped at this time in point and the image sensor 30 is held in a driven state. In this state, the process waits for the switch 54b to be turned on (Step S19). If the switch 54a is turned off, the diaphragm 26 is fully opened (Step S20). Then, the focusing lens 10a is moved to the predetermined standby position (infinity focus position) and the driving of the image sensor 30 is stopped (Step S13'), thus completing the photographic operation.

In the fifth embodiment, while the focal lengths of the photographic optical system and the viewfinder optical system are being adjusted through the zoom button 40 (the switch 40a or 40b), if driving of the image sensor 30 is started, such focal adjustment operation is stopped. Even if the zoom button 40 is pressed during the driving of the image sensor 30, movement of the optical systems for the purpose of focal-length adjustment is not performed.

As a matter of course, the recording medium for recording a photographed image may be a solid-state memory such as a semiconductor memory.

Although the above-described fifth embodiment employs a zoom lens system whose focal length can be continuously varied, the above-described fifth embodiment is similarly applicable to a lens system having two or more particular focal lengths which can be selectively set. As a matter of course, the arrangement of a lens (a lens group) to be moved for focusing purpose is not limited to the shown example. If lenses (a lens arrangement) for focal-length adjustment, or a variable-power lens arrangement, is to be used as a focusing lens, each lens group of the variable-power lens arrangement may be independently moved along the optical axis, and it may be necessary to independently control the movement of each lens group. A mechanism for realizing this control is disclosed in, for example, U.S. Pat. No. 4,008,951.

As can be readily understood from the foregoing description, according to the fifth embodiment, if driving of the image sensor is initiated during the focal-length adjustment operation of the photographic optical system, the focal-length adjustment operation of the photographic optical system is stopped. Accordingly, it is possible to efficiently utilize the electrical power source of a camera and it is also possible to obtain good image signals free from disturbance from the image sensor.

A sixth embodiment of the present invention will be described below.

The construction of the sixth embodiment is substantially identical to those shown in FIGS. 1 and 2, and its operation merely differs as explained below.

Figure 8B:
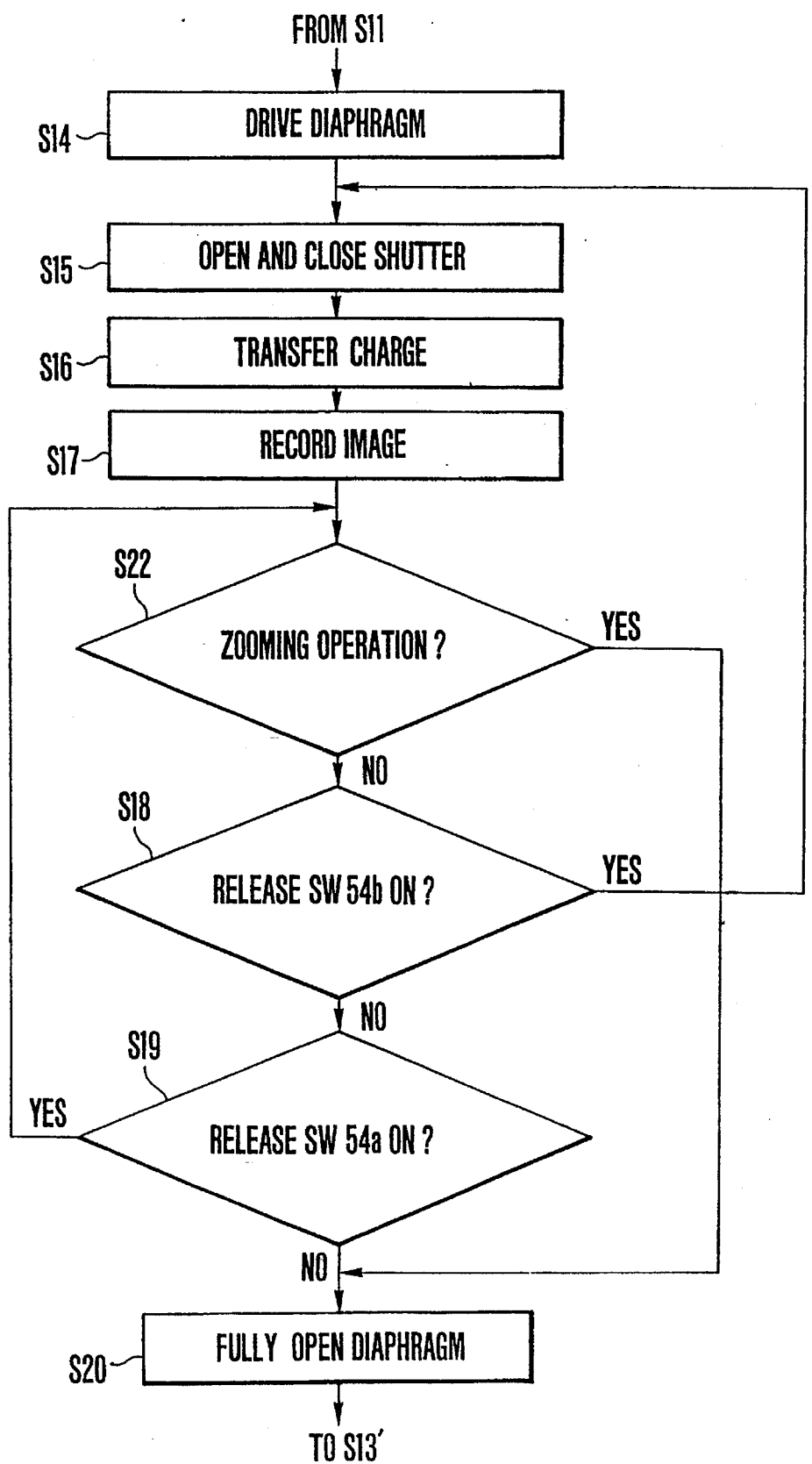

The operation of the sixth embodiment will now be described with reference to FIGS. 8A and 8B.

When the power switch (not shown) is actuated to supply electrical power from the electrical power source 50, the camera controlling circuit 48 fully opens the diaphragm 26, closes the shutter 27, and moves the focusing lens 10a to a position where infinity is in focus (Step S1). A photographer determines a desired composition in this state, that is, presses either of the switches 40a and 40b of the zoom button 40 while viewing through the viewfinder. If the switch 40a is pressed (Step S2), the motors 34 and 36 are driven forward to shift the photographic optical system and the viewfinder optical system toward the telephoto side (Step S3). If the switch 40b is pressed (Step S4), the motors 34 and 36 are driven backward to shift the photographic optical system and the viewfinder optical system toward the wide-angle side (Step S5).

After the desired composition has been determined in the above-described manner, the photographer presses the shutter release button (not shown). When the shutter release button is depressed by a half stroke and the release switch 54a is turned on (Step S6), the camera controlling circuit 48 meters the luminance of a subject through the light-metering circuit 42, meters the distance to the subject through the distance-metering circuit 44, and adjusts white balance (Step S7). Subsequently, the camera controlling circuit 48 initiates driving of the image sensor 30 (Step S8'). The camera controlling circuit 48 determines an aperture value and a shutter speed on the basis of metered-light information and the amount of travel of the focusing lens 10a on the basis of metered-distance information (Step S9), and moves the focusing lens 10a to the determined position through the motor 32 (Step S10).

After Step 10, while the release switch 54a is on, the state of the zoom button 40 (Step S21) or that of the release switch 54b is identified. If the zoom button 40 is actuated (Step S21), the focusing lens 10a is moved to a predetermined standby position (infinity focus position), and the driving of the image sensor 30 is stopped (Step S13'). The process then returns to Step S2. While the release switch 54a is on, the process waits for the shutter release button to be further depressed to turn on the release switch 54b (Steps S11 and S12). If the release switch 54a is turned off (Step S12), this indicates that no photography is performed. Accordingly, the focusing lens 10a is moved to a predetermined standby position (infinity focus position), and the driving of the image sensor 30 is stopped (Step S13'). The process then returns to Step S2. If the release switch 54b is turned on, a photographic operation is initiated. The diaphragm 26 is driven so that the aperture value determined in Step S9 is set (Step S14), and the shutter 27 is made open for the determined shutter time only (Step S15). The charge stored in the image sensor 30 by the opening and closure of the shutter 27 is read out and transferred to the recording circuit 46 (Step S16), and the photographed image is recorded on an unrecorded area of the rotary recording medium (Step S17).

Subsequently, if the switch 54a is off (Step S19), the states of the zoom button 40 and the release switch 54b are identified (Steps S22 and S18). If the zoom button 40 is actuated, the aperture is fully opened (Step S13') and the process proceeds to Step S20. If the release switch 54b remains on, the photographic and recording operations (Steps S15 to S17) are repeated (Step S18). If the release switch 54b is turned off with the switch 54a remaining on, the focusing lens 10a is stopped at this point in time and the image sensor 30 is held in a driven state. If the switch 54a is turned off, the diaphragm 26 is fully opened (Step S20). Then, the focusing lens 10a is moved to the predetermined standby position (infinity focus position) and the driving of the image sensor 30 is stopped (Step S13'), thus completing the photographic operation.

In the sixth embodiment, when the focal lengths of the photographic optical system and the viewfinder optical system are being adjusted through the zoom button 40 (the switch 40a or 40b), if driving of the image sensor 30 is initiated, such focal-length adjustment operation is stopped. When the zoom button 40 is pressed during the driving of the image sensor 30, if a photographed image is being recorded, the driving of the image sensor 30 is, after completion of recording, stopped and movement of the optical systems for the purpose of focal-length adjustment is started. If a photographed image is not being recorded, the driving of the image sensor is immediately stopped and movement of the optical systems for the purpose of focal-length adjustment is started. As a matter of course, during the photographic recording operation, the image sensor 30 is being driven.

As a matter of course, the recording medium for recording a photographed image may be a solid-state memory such as a semiconductor memory.

Although the above-described sixth embodiment employs a zoom lens system whose focal length can be continuously varied, the above-described sixth embodiment is similarly applicable to a lens system having two or more particular focal lengths which can be selectively set. As a matter of course, the arrangement of a lens (a lens group) to be moved for focusing purpose is not limited to the shown example. If lenses (a lens arrangement) for focal-length adjustment, or a variable-power lens arrangement, is to be used as a focusing lens, each lens group of the variable-power lens arrangement may be independently moved along the optical axis, and it may be necessary to independently control the movement of each lens group. A mechanism for realizing this control is disclosed in, for example, U.S. Pat. No. 4,008,951.

As can be readily understood from the foregoing description, according to the sixth embodiment, since driving of image sensing means and a focal-length adjustment operation are not simultaneously executed, it is possible to efficiently utilize an electrical power source. Since no focal-length adjustment operation is executed during the driving of the image sensing means, the operation of the image sensing means does not become unstable, so that good output image signals can be obtained.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent arrangements and functions.

What is claimed is:

1. An image pickup apparatus, comprising:
   (a) image pickup means for forming an electrical image signal according to an optical image;
   (b) an optical system for controlling optical condition of the image on said image pickup means;
   (c) recording means for recording said electrical image signal;
   (d) a first trigger means for starting a recording operation of said recording means;
   (e) a second trigger means for starting a control operation of said optical system independently of said first trigger means; and
   (f) halting means for temporarily halting the control operation of said optical system even during said second trigger means is being actuated when said first trigger means is actuated, and for resuming the control operation of said optical system after said recording operation is completed.

2. An image pickup apparatus according to claim 1, wherein said optical system comprises zooming means.

3. An image pickup apparatus according to claim 1, wherein said optical system includes an auto-focusing optical system.

4. An image pickup apparatus, comprising:
   (a) image pickup means for forming an electrical image signal according to an optical image;
   (b) an optical system for controlling optical condition of the image on said image pickup means;
   (c) a first trigger means for starting an image pickup operation of said image pickup means;
   (d) a second trigger means for starting a control operation of said optical system independently of said first trigger means; and
   (e) halting means for temporarily halting the control operation of said optical system even during said second trigger means is being actuated when said first trigger means is actuated, and for resuming the control operation of said optical system after said image pickup operation is completed.

5. An image pickup apparatus according to claim 4, wherein said optical system comprises zooming means.

6. An image pickup apparatus according to claim 4, wherein said optical system includes an auto-focusing optical system.

7. An image pickup apparatus according to claim 4, further comprising recording means for recording said electrical image signal.

8. An image pickup apparatus comprising:
   (a) image pickup means for photoconverting an optical image into an electrical signal;
   (b) optical means for changing said optical image on said image pickup means;
   (c) storing means for storing said electrical signal read out from said image pickup means;
   (d) storing trigger means for triggering a storing operation with said storing means;
   (e) trigger means for triggering a changing operation with said optical means independently of said storing trigger means; and
   (f) halting means for temporarily halting the changing operation of said optical means even during said trigger means is being actuated when said storing trigger means is actuated, and for resuming the changing operation of said optical means after said storing operation is completed.

9. An image pickup apparatus according to claim 8, wherein said optical means comprises zooming means.

10. An image pickup apparatus according to claim 8, wherein said optical means includes an auto-focusing optical system.

* * * * *

UNITED STATES PATENT AND TRADEMARK OFFICE
CERTIFICATE OF CORRECTION

PATENT NO. : 5,612,737
DATED : March 18, 1997
INVENTOR(S) : Nagano, Masatoshi

It is certified that error appears in the above-identified patent and that said Letters Patent is hereby corrected as shown below:

Col. 1, line 7, delete "08/394 069" and insert -- 08/394,069 --.

Signed and Sealed this

Ninth Day of June, 1998

Attest:

BRUCE LEHMAN

Attesting Officer    Commissioner of Patents and Trademarks